(12) United States Patent
Kourogi et al.

(10) Patent No.: US 8,778,471 B2
(45) Date of Patent: Jul. 15, 2014

(54) PROPYLENE RESIN COMPOSITION AND MOLDED ARTICLE

(75) Inventors: Hidehiro Kourogi, Nobeoka (JP); Chisato Nakazono, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 0 days.

(21) Appl. No.: 13/577,846

(22) PCT Filed: Jan. 14, 2011

(86) PCT No.: PCT/JP2011/051024
§ 371 (c)(1),
(2), (4) Date: Aug. 8, 2012

(87) PCT Pub. No.: WO2011/096282
PCT Pub. Date: Aug. 11, 2011

(65) Prior Publication Data
US 2012/0305123 A1 Dec. 6, 2012

(30) Foreign Application Priority Data
Feb. 8, 2010 (JP) ................................ 2010-025628

(51) Int. Cl.
*B29C 47/00* (2006.01)
*C08L 23/14* (2006.01)
*C08L 23/16* (2006.01)
*B32B 1/00* (2006.01)

(52) U.S. Cl.
CPC ................. *C08L 23/14* (2013.01); *C08L 23/16* (2013.01); *C08L 2205/22* (2013.01); *B32B 2597/00* (2013.01); *B32B 1/00* (2013.01)
USPC .......... 428/36.7; 525/240; 524/240; 524/140; 524/191

(58) Field of Classification Search
CPC ......... C08L 23/14; C08L 21/00; C08L 23/16; C08L 2205/22; C08K 5/0083; C08K 5/053; C08K 5/521; B65B 5/00; B32B 1/08; B32B 2597/00; F16L 9/00
USPC ................. 428/36.9; 524/240, 140, 191, 145; 525/240
See application file for complete search history.

(56) References Cited

U.S. PATENT DOCUMENTS

| | | | | |
|---|---|---|---|---|
| 6,639,002 | B2 * | 10/2003 | Okawa et al. | 524/442 |
| 6,759,465 | B1 * | 7/2004 | Kanzaki et al. | 524/451 |
| 7,655,721 | B2 * | 2/2010 | Watanabe et al. | 524/505 |
| 8,058,340 | B2 * | 11/2011 | Kourogi et al. | 524/451 |
| 8,344,050 | B2 * | 1/2013 | Inoue et al. | 524/100 |
| 2003/0100664 | A1 * | 5/2003 | Okawa et al. | 524/526 |
| 2005/0234172 | A1 | 10/2005 | Musgrave et al. | |
| 2008/0085977 | A1 * | 4/2008 | Okamoto et al. | 525/240 |
| 2008/0220193 | A1 | 9/2008 | Tohi et al. | |
| 2010/0261843 | A1 * | 10/2010 | Kameo et al. | 525/64 |
| 2011/0056584 | A1 * | 3/2011 | Onodera et al. | 138/177 |
| 2011/0124817 | A1 * | 5/2011 | Dias et al. | 525/240 |
| 2011/0169199 | A1 * | 7/2011 | Weng et al. | 264/500 |
| 2012/0045600 | A1 * | 2/2012 | Weng et al. | 428/36.4 |
| 2012/0302701 | A1 * | 11/2012 | Martin et al. | 525/191 |
| 2012/0305123 | A1 * | 12/2012 | Kourogi et al. | 138/177 |

FOREIGN PATENT DOCUMENTS

| | | |
|---|---|---|
| EP | 2110409 A1 | 10/2009 |
| JP | 7-179684 A | 7/1995 |
| JP | 8-012827 A | 1/1996 |
| JP | 8-157659 A | 6/1996 |
| JP | 9-124857 A | 5/1997 |
| JP | 3315015 B2 | 8/2002 |
| JP | 2004-196959 A | 7/2004 |
| JP | 2005-163983 A | 6/2005 |
| JP | 2007-186664 A | 7/2007 |
| JP | 2007-321100 A | 12/2007 |
| JP | 2007-321102 A | 12/2007 |

OTHER PUBLICATIONS

Shinzo Kohjiya et al., "Compounding Design of Rubber and Nano-Composite" (Rubber Zairyo no Haigo Gijutsu to Nano Composite), Jul. 31, 1995, pp. 30-33.
International Search Report (PCT/ISA/210) issued on Mar. 1, 2011, by the Japanese Patent Office as the International Searching Authority for International Application No. PCT/JP2011/051024.
Extended European Search Report dated Mar. 3, 2014, issued in corresponding EP 11739631.7-1304/2535374.

* cited by examiner

*Primary Examiner* — N. Edwards

(74) *Attorney, Agent, or Firm* — Buchanan Ingersoll & Rooney PC

(57) ABSTRACT

A propylene resin composition which contains as essential components thereof (A) an ethylene-propylene random copolymer having an ethylene content of 0.5 to 3.0 parts by mass; (B) an elastomer having an average particle diameter of 10 to 800 nm in an amount of 1 to 10 parts by mass based on 100 parts by mass of the ethylene-propylene random copolymer; and (C) a crystalline nucleating agent, and in which after kneading thereof, the kneaded propylene resin composition exhibit a melt flow rate (MFR) of 0.01 to 1.00 g/10 min. The propylene resin composition is suitable for the production of a wide variety of molded articles.

7 Claims, No Drawings

PROPYLENE RESIN COMPOSITION AND MOLDED ARTICLE

TECHNICAL FIELD

The present invention relates to a propylene resin composition suitably used in the production of a wide variety of molded articles, and a molded article produced using the same. More specifically, the present invention relates to a propylene resin composition having excellent properties such as transparency, heat resistance, impact resistance and creep resistance at a high temperature, and a molded article produced using the same.

BACKGROUND ART

Hitherto, piping members made by molding of a propylene resin composition have been widely utilized in a variety of factories, medical fields and construction fields, for example, since the propylene resin composition can exhibit excellent properties such as rigidity, heat resistance and chemical resistance. Especially, pipes of the propylene resin are suitable for use as the piping member in the industrial fields through which a chemical or its solution at a high temperature is guided, since the propylene resin-made pipes exhibit a good chemical resistance to acids and alkalis at an area of increased temperature (60 to 95° C.), and are produced at a low price. Accordingly, there is a tendency to use resin-made pipes in place of the prior art metal-made pipes conventionally used. Further, a propylene resin-made pipe has been proposed for such resin-made pipes, and thus is expected to be widely used in the future. Furthermore, recently, there have been requested at an increasing degree of need to provide a transparent piping member capable of visually observe, from an outside of the piping member, foreign substances contained in the flowing fluid in the piping member for the purpose of improving safety of the piping system. Accordingly, ensuring transparency of the piping members made of a propylene resin which are able to be used under all the application conditions is being pursued.

In certain fields, "translucent" piping members made of a propylene resin have been used. However, when a transparency of the propylene resin is increased in such piping members, physical properties such as impact strength and tensile elasticity which are required in the piping members are reduced. Accordingly, using such piping members made of a propylene resin which have a certain level of transparency along with the physical strength suitable as the piping member, the transparency is insufficient to confirm a state of the flowing fluid in the piping member. The transparency is a level of the haze value of about 78% at which it is only able to confirm whether or not a fluid is flowing in the piping member.

As a method of improving a transparency of the piping member molded from the propylene resin composition, it is well known, for example, to add a nucleating agent for clearing to the polypropylene resin (see, Patent Reference 1). Described therein is a pipe joint for food piping which is used in the formation of piping system of foods and is constituted with a female element and a male element capable of being inserted in an inner surface of the female element. The female element has a transparent section through which at least a tip side of the inserted male element can be visually confirmed, and the transparent section is made of the propylene resin having added thereto a nucleating agent for clearing. Normally, the polypropylene resin has a color of white or creamy white, but a transparency of the pipe joint made of the same resin can be increased if a nucleating agent for clearing is added to the resin. That is, according to this method, since the female element has a transparent section formed by adding the nucleating agent to the polypropylene resin, it is possible to visually confirm at least a tip side of the male element inserted into the pipe joint.

However, when the nucleating agent is added to the polypropylene resin as is described above, there is caused a fatal problem, i.e., lowering in the impact resistance required in the piping member due to addition of the nucleating agent, while the transparency of the piping member can be improved as a result of addition of the nucleating agent. Due to lowering of the impact resistance, the pipe joint can be relatively easily cracked, and thus the applications of the pipe joint are unusually limited to, for example, use under the lowered inner pressure.

Then, in order to simultaneously improve both the transparency and the impact resistance of the polypropylene resin composition, there have been suggested a polypropylene sheet for use in a press through pack (PTP) packaging (see, Patent Reference 2). The PTP packaging is applied to the packaging of medicines such as tablets and capsules. The polypropylene sheet comprises 57 to 84% by weight of polypropylene homopolymer containing a crystal nucleating agent in an amount of 0.002 to 0.3% by weight, 10 to 25% by weight of ethylene-propylene random copolymer containing an ethylene in an amount of 0.1 to 5.0% by weight, 1 to 8% by weight of a petroleum resin and 5 to 10% by weight of a thermoplastic elastomer. The thermoplastic elastomer added is a hydrogenated styrene-butadiene copolymer containing a styrene in an amount of 11 to 35% by weight or a hydrogenated styrene-isoprene copolymer containing a styrene in an amount of 11 to 35% by weight. The propylene sheet has excellent properties such as rigidity, moisture resistance, transparency, moldability and impact resistance.

The prior art resin composition described above can improve impact resistance due to incorporation of the thermoplastic elastomer. However, the resin composition still suffers from a reduction in impact resistance due to incorporation of a crystal nucleating agent. Accordingly, the impact resistance of resin composition is insufficient when the composition is used in the production of the piping member. Further, when an amount of the incorporated thermoplastic elastomer is increased in order to inhibit a reduction of the impact resistance, a problem of deteriorating a transparency of the piping member is caused.

In addition, since the above method is especially developed to produce the polypropylene sheets, the melt flow rate of the polypropylene homopolymer and ethylene-propylene random copolymer, before kneading thereof, is generally in the range of 1 to 10 g/10 min. Such a melt flow rate is considered to be excessively high, if the composition is used to form pipes using an extrusion molding process. Therefore, using the above method, molded pipes cannot be produced due to draw down of the composition during molding. Further, even if the molded pipes could be produced, the resulting pipes suffer from a shortened service life due to insufficient creep resistance of the pipes. Furthermore, since the impact strength is insufficient for the piping member, there is a possibility of generating problems such as breakage of the pipes.

CITATION LIST

Patent Literature

Patent Literature 1: JP2005-163983A
Patent Literature 2: JP3315015B

SUMMARY OF INVENTION

Technical Problem

It is an object of the present invention to provide a propylene resin composition suitably used in the production of molded articles, for example, pipes produced with an extrusion molding process, and piping members produced with an injection molding process, for example, joints, flanges, valves and casings for an actuator, and a molded article produced using the same. More particularly, an object of the present invention is to provide a propylene resin composition having excellent properties such as transparency, heat resistance, impact resistance and creep resistance at a high temperature, and a molded article produced using the same.

Solution to Problem

The inventors of the present invention have conducted intensive studies for developing the propylene resin composition having the preferred properties described above, and now found, with completion of the present invention, that the above objects can be accomplished by using a blended resin composition containing as essential components a specific propylene resin, a specific elastomer, and a nucleating agent for clearing.

That is, the first feature of the present invention resides, in a propylene resin composition which contains as essential components thereof (A) an ethylene-propylene random copolymer having an ethylene content of 0.5 to 3.0 parts by mass; (B) an elastomer having an average particle diameter of 10 to 800 nm in an amount of 1 to 10 parts by mass per 100 parts by mass of the ethylene-propylene random copolymer; and (C) a crystalline nucleating agent, and in which after kneading thereof, the kneaded propylene resin composition exhibit a melt flow rate (MFR) of 0.01 to 100 g/10 min.

The second feature of the present invention resides in that the ethylene-propylene random copolymer (A) is a blend of 25 to 75 parts by mass of propylene homopolymer and 75 to 25 parts by mass of ethylene-propylene random copolymer.

The third feature of the present invention resides in that the crystalline nucleating agent (C) is a nucleating agent based on sugars and/or a nucleating agent based on organic phosphoric acids.

The fourth feature of the present invention resides in that when the creep resistance is determined with a tensile load of 3.5 MPa in an atmosphere of 95° C., the time required to cause a breakage of the composition is not less than 1,000 hours.

The fifth feature of the present invention resides in that the propylene resin composition is used as a molding material for piping members.

Further, the sixth feature of the present invention resides in a molded article which is a molded product produced from the propylene resin composition according to the present invention.

The seventh feature of the present invention resides in that the molded article is a pipe, a multilayered pipe, a plate, a tank, a duct, a joint, a flange, a valve or a casing of an actuator.

Furthermore, the eighth feature of the present invention resides in a piping member molded using the propylene resin composition according to the present invention. The piping member may be fully formed from a molded article formed from the propylene resin composition according to the present invention, or may be partially formed from the propylene resin composition according to the present invention.

Advantageous Effects of Invention

As is appreciated from the detailed descriptions which will follow, using the propylene resin composition according to the present invention, it becomes possible to produce molded articles, for example, piping members, having the following excellent properties.

(1) Transparent piping members having an excellent transparency and capable of visually confirming an inclusion of foreign substances in the fluid flowing through the piping member can be obtained.

(2) Transparent piping members having a transparency and a heat resistance and impact resistance which are equivalent to those of the prior art propylene piping members can be obtained, since a combination of crystalline nucleating agent and an elastomer having an average particle diameter of 10 to 800 nm is added to the propylene resin.

(3) Piping members which have an excellent creep resistance at a high temperature and thus can be used for a long period of time under the flowing condition of a fluid at a high temperature of 95° C. can be obtained.

DESCRIPTION OF EMBODIMENTS

The present invention can be advantageously carried out with different embodiments. Preferred embodiments of the present invention include the following embodiments to which the present invention is not restricted.

The propylene resin composition of the present invention contains as an essential component thereof an ethylene-propylene random copolymer (A). In the practice of the present invention, it is required that the ethylene-propylene random copolymer has an ethylene content of 0.5 to 3.0 parts by mass. Good impact resistance and transparency can be obtained because of presence of ethylene. Accordingly, ethylene is preferably contained in an amount of not less than 0.5 parts by mass. Further, ethylene is preferably contained in an amount of not more than 3.0 parts by mass for the purpose of using the piping member under the application of a high temperature fluid, while maintaining a heat resistance and rigidity of the piping member. Further, for the purpose of obtaining in balance an impact resistance of the piping member as well as a heat resistance and rigidity of the piping member, it is desired that ethylene is contained in an amount of 0.5 to 2.0 parts by mass.

Further, it is desired that the ethylene-propylene random copolymer has a certain range of melt flow rate (MFR) in the propylene resin composition containing the same. Before kneading thereof, it is desired that the propylene resin composition has a MFR of 0.01 to 0.9 g/10 min, more desirably 0.01 to 0.80 g/10 min. Further, in order to obtain a good productivity of the propylene resin composition, MFR is preferably not less than 0.01 g/10 min. Furthermore, in order to obtain a good creep resistance at a high temperature while inhibiting draw down of the resin during molding of pipe members, MFR is preferably not more than 1.00 g/10 min. Moreover, since kneading of the propylene resin composition can increase a MFR rate of the composition in comparison with the MFR rate of the corresponding composition not yet kneaded, it is desired that the MFR rate of the kneaded propylene resin composition is adjusted to a range of 0.01 to 1.00 g/10 min. This is because, as described above, a productivity of the propylene resin composition is reduced, when the MFR is lowered to below 0.01 g/10 min, whereas a draw down of the resin during the pipe molding cannot be inhibited when the MFR is increased above 1.00 g/10 min. Moreover, it is preferred that the MFR rate is not more than 0.80 g/10 min, since such a rate especially ensures a good moldability. Note that the MFR rates of the propylene resin composition described herein can be determined using the methods and apparatuses well-known in the art.

The ethylene-propylene random copolymer can be produced using any of the methods and apparatuses well known in the art. For example, the ethylene-propylene random copolymer may be produced by conducting a polymerization in a polymerization apparatus with the well known polymerization methods in a batch process, a semi-continuous process or a continuous process. However, the random copolymer may be produced in a multistage polymerization process in which one or more polymerization apparatuses to which different polymerization conditions are applied are connected in series. Note, however, in the production of the ethylene-propylene random copolymer that the ethylene content is 0.5 to 3.0 parts by mass per 100 parts by mass of the ethylene-propylene random copolymer.

In addition, after production thereof, the ethylene-propylene random copolymer may be used without blending with other resin(s). Alternatively, the ethylene-propylene random copolymer may be used, after the copolymer was produced by mixing in any suitable mixing apparatus propylene homopolymer and ethylene-propylene random copolymer which were prepared separately. When the ethylene-propylene random copolymer is produced by mixing the propylene homopolymer and the ethylene-propylene random copolymer, it becomes possible to produce the propylene resin compositions suitable for different molding methods, because a mixing ratio of the homopolymer and the copolymer can be varies or controlled depending upon the molding methods such as extrusion molding and injection molding used in the molding of the piping members such as pipes.

For example, when pipes are produced using an extrusion molding process from the propylene resin composition, it is preferred that the resin composition has a lowered ethylene content. However, the same resin composition having a lowered ethylene content cannot be applied with the satisfactory results to the injection molding of other parts such as joints and valves, since voids are easily generated in the resulting parts. Accordingly, in the injection molding of the joints, valves and other parts, it is preferred to increase an ethylene content in the resin composition to thereby inhibit formation of voids.

Further, the propylene homopolymer and the ethylene-propylene random copolymer may be used in any optional combination depending upon applications intended for the resin composition, insofar as these two types of resins are used. For example, the resin composition may be prepared using the propylene homopolymer and two or more of the ethylene-propylene random copolymers having different ethylene contents.

In the above instances, it is preferred that the ethylene-propylene random copolymer is produced by blending 25 to 75 parts by mass of the propylene homopolymer and 75 to 25 parts by mass of the ethylene-propylene random copolymer. For use of the piping members as a guide of a high temperature fluid while maintaining a good heat resistance and rigidity of the members, it is preferred that the propylene homopolymer is not less than 25 parts by mass, and the ethylene-propylene random copolymer is not more than 75 parts by mass. Further, for the purpose of obtaining a good impact resistance and transparency, it is preferred that the propylene homopolymer is not more than 75 parts by mass, and the ethylene-propylene random copolymer is not less than 25 parts by mass. Furthermore, an ethylene content of the ethylene-propylene random copolymer blended is desirably 2.5 to 4.0%, more desirably 2.8 to 3.5%. Since it is blended with the propylene homopolymer, the ethylene-propylene random copolymer may be selected so that the ethylene content amounts on 0.5 to 3.0 parts by mass per 100 parts by mass of the ethylene-propylene random copolymer. If it can satisfy this range of the ethylene content, the ethylene-propylene random copolymer blended has a high versatility, and thus the propylene resin composition can be suitably and relatively easily produced using commercially available products as the starting material.

An elastomer (B) is another essential component in the propylene resin composition of the present invention, and is incorporated in the resin composition in order to improve an impact resistance of the composition. When using the elastomer in the present invention, it is necessary that the elastomer has an average particle diameter of 10 to 800 nm. This is because the elastomer can improve an impact resistance of the resin, but it has a tendency of deteriorating a transparency of the resin. According to the present invention, the reduction of the transparency can be prevented by using finely divided elastomer having a small average particle diameter.

Further, since the elastomer has a small average particle diameter, the elastomer can exhibit a synergistic action, i.e., improvement of an impact resistance while maintaining an excellent transparency, when it is used in combination with a crystalline nucleating agent (C) which is another essential component of the present invention. Accordingly, it is preferred that the elastomer has a small average particle diameter of not more than 800 nm for obtaining a good impact resistance. Further, for improving a dispersibility, thereby stabilizing the physical properties, it is preferred that the elastomer has a small average particle diameter of not more than 600 nm. Furthermore, for producing the elastomer at a good productivity, it is preferred that the elastomer has a small average particle diameter of not less than 10 nm, more preferably not less than 100 nm for easily maintaining a stability of the particle diameter of the resulting particles.

Generally, the elastomer described above is incorporated into the composition in an amount of 1 to 10 parts by mass. The amount of not less than 1 part by mass is preferred for improving an impact resistance of the polypropylene resin, and the amount of not more than 10 part by mass is preferred for enabling to use the piping members for a high temperature fluid through the maintenance of a good heat resistance and rigidity of the members without lowering a transparency thereof.

In carrying out the present invention, a wide variety of elastomers may be incorporated into the propylene resin composition. Suitable elastomer includes rubber-like polymer, olefin elastomer and styrene elastomer. More particularly, suitable elastomer includes diene rubber such as butadiene rubber, isoprene rubber, butyl rubber, styrene-butadiene copolymer, styrene-butadiene-styrene block copolymer (SBS), styrene-isoprene-styrene block copolymer (SIS), styrene-ethylene-butylene-styrene block copolymer (SEBS), styrene-ethylene-propylene-styrene block copolymer (SEPS) and butadiene-isoprene copolymer; copolymer of ethylene and α-olefin such as ethylene-propylene rubber, ethylene-propylene copolymer (EPM), ethylene-propylene-diene copolymer (EPDM), ethylene-butene copolymer and ethylene-octene copolymer (EOR); terpolymer of ethylene, propylene and non-conjugated diene such as copolymer of ethylene, propylene and ethylidenenorbornene and copolymer of ethylene, propylene and hexadiene; butylene-isoprene copolymer; and hydrogenated polymers of these elastomers. Basically, the known elastomers may be used without limitation, if they have an average particle diameter of 10 to 800 nm. Further, these elastomers may be used alone or as a combination of two or more elastomers.

Further, used as another essential component in the propylene resin composition of the present invention is a crystalline nucleating agent (C). The crystalline nucleating agent includes an organic nucleating agent and an inorganic nucleating agent. Among these nucleating agents, the inorganic nucleating agent cannot be used in the practice of the present invention, since it can inhibit a transparency of the resin composition. That is, an organic nucleating agent is used in the practice of the present invention. The crystalline nucleating agent is incorporated into the resin composition especially for the purpose of improving an impact resistance, rigidity and transparency.

The amount of the crystalline nucleating agent incorporated into the resin composition is not restricted to the specific range, but it is preferred that the amount of the agent is an amount effective to attain an improvement of the impact resistance, rigidity and transparency. Generally, the nucleating agent may be incorporated in a small amount on the basis of the ethylene-propylene random copolymer. More particularly, for the purpose of obtaining a balanced effects of good transparency and other physical properties, it is preferred that the nucleating agent is used in an amount of 0.005 to 0.5 parts by mass. The nucleating agent is preferably added in an amount of not less than 0.005 parts by mass in order to obtain a good transparency of the resin composition originated from the effect of the added nucleating agent. Further, it is preferred that the nucleating agent is used in an amount of not more than 0.5 parts by mass in order to avoid an excessive addition of the agent and at the same time to inhibit a reduction of the impact resistance, since the effect of improving a transparency obtained upon addition of the nucleating agent is saturated when the amount of the nucleating agent added is above 0.5 parts by mass.

The organic nucleating agent includes sugars, aliphatic alcohols, metal salts of carboxylic acids, esters of carboxylic acids, metal salts of aromatic carboxylic acids, organic phosphoric acids and resin acids. Among these organic nucleating agents, sugars and/or organic phosphoric acids are preferably used, since they are conventionally used and are easily available on a commercial base. More desirably, the sugars as the nucleating agent can exhibit a high effect of improving a transparency of the resin composition, and the organic phosphoric acids as the nucleating agent can exhibit a high effect of improving an impact resistance of the resin composition. Note that the known organic nucleating agents may be used without limitation, and they may be used alone or as a combination of two or more agents.

Sugars as the nucleating agent include sorbitols, nonitols and xylitols. Typically, these nucleating agents include bis-1,3:2,4-(3'-methyl-4'-fluorobenzylidene)1-propylsorbitol, bis-1,3:2,4-(3',4'-dimethylbenzylidene)1'-methyl-2'-propenyl-sorbitol, bis-1,3,2,4-dibenzylidene-2',3'-dibromopropylsorbitol, bis-1,3,2,4-dibenzylidene-2'-bromo-3'-hydroxypropylsorbitol, bis-1,3:2,4-(3'-bromo-4'-ethylbenzylidene)-1-allylsorbitol, mono-2,4-(3'-bromo-4'-ethylbenzylidene)-1-allylsorbitol, bis-1,3:2,4-(4'-ethylbenzylidene)-1-allylsorbitol, bis-1,3:2,4-(3',4'-dimethylbenzylidene)1-methylsorbitol, 1,2,3-trideoxy-4,6:5,7-bis[(4-propylphenyl)methylene]-nonitol, bis-1,3:2,4-(4'-ethylbenzylidene)1-allylsorbitol, bis-1,3:2,4-(5',6',7',8'-tetrahydro-2-naphthaldehydebenzylidene)1-allylxylitol and bis-1,3:2,4-(3',4'-dimethylbenzylidene)1-propylxylitol.

Organic phosphoric acids as the nucleating agent include compounds such as esters of phosphoric acids. Typically, these nucleating agents include a sodium salt of bis(4-t-butylphenyl) phosphoric acid, a lithium salt of bis(4-t-butylphenyl) phosphoric acid, an aluminum salt of bis(4-t-butylphenyl) phosphoric acid, a sodium salt of 2,2'-methylene-bis(4,6-di-t-butylphenyl) phosphoric acid, a lithium salt of 2,2'-methylene-bis(4,6-di-t-butylphenyl) phosphoric acid, an aluminum salt of 2,2'-methylene-bis(4,6-di-t-butylphenyl) phosphoric acid, a potassium salt of 2,2'-methylidene-bis(4,6-di-t-butylphenyl) phosphoric acid, a sodium salt of 2,2'-ethylidene-bis(4,6-di-t-butylphenyl) phosphoric acid, a lithium salt of 2,2'-ethylidene-bis(4,6-di-t-butylphenyl) phosphoric acid, an aluminum salt of 2,2'-ethylidene-bis(4,6-di-t-butylphenyl) phosphoric acid and a potassium salt of bis(4-t-butylphenyl) phosphoric acid.

If desired, the propylene resin composition of the present invention may optionally contain one or more additives incorporated therein. For example, an antioxidation agent may be incorporated as an additive in the resin composition. The antioxidation agent suitable for use in the production of piping members includes a phenol-based agent, a phosphor-based agent and a sulfur based agent. Since it can exhibit its effect at an area of high temperature, a phenol-based antioxidation agent is suitable to inhibit an oxidation due to the molding temperature applied during, for example, injection molding. The phosphor-based antioxidation agent is suitable, since it can act as an aid of inhibiting a radical formation of the phenol-based antioxidation agent. Since it can effectively exhibit a thermal resistance for a long time period, the sulfur based antioxidation agent is suitable to inhibit a deterioration of the piping member due to oxidation which is caused, for example, when a fluid at a temperature of about 95° C. is guided for a long time period through the piping member. The phenol-based, phosphor-based and sulfur based antioxidation agents may be used alone, but if they are used in combination, synergistic effects will be obtained, thereby enabling to obtain satisfactory effects at an inhibited amount of incorporation which is effective to prevent a dissolution of the agents from the piping member, while improving both the antioxidation effect and the maintenance effect of the heat resistance for a long time period.

Further, it is desired that the phenol-based antioxidation agent is incorporated in an amount of 0.05 to 1.00 parts by mass based on 100 parts by mass of the ethylene-propylene random copolymer. Suitable phenol-based agent includes tetrakis[methylene-3-(3',5'-di-t-butyl-4'-hydroxyphenyl)propionate]methane. It is desired that the phosphor-based antioxidation agent is incorporated in an amount of 0.05 to 1.00 parts by mass based on 100 parts by mass of the ethylene-propylene random copolymer. Suitable phosphor-based agent includes tris(2,4-di-t-butylphenyl)phosphite. It is desired that the sulfur-based antioxidation agent is incorporated in an amount of 0.05 to 1.00 parts by mass based on 100 parts by mass of the ethylene-propylene random copolymer. Suitable sulfur-based agent includes distearyl of 3.3'-thiodipropionic acid.

Furthermore, if desired, other additives may be incorporated into the resin composition, insofar as they do not adversely affect on the transparency of the resin composition. Other additives include an UV absorbing agent, a light stabilizing agent (hindered amines, benzoates and benzophenones), a lubricant (hydrocarbons such as fluid paraffine, aliphatic acids such as stearic acid, higher alcohols such as stearic alcohol, amides such as stearate amide, and metal soaps such as potassium stearate), and a antibacterial agent (inorganic agents such as zeolite, and organic agents such as 2-(4-thiazolyl)benzimidazole). It is preferred that these additives are added in an amount sufficient to obtain the effect of the added additive without lowering the physical properties of the resin composition, since the amount of the additives added can be varied depending on the type of the additives. In addition, if desired, an inorganic filler such as talk, a flame retardant agent, an antistatic agent, a nucleating agent and others may be incorporated into the resin composition.

The propylene resin composition according to the present invention may be produced by using any conventional methods from the essential components and optional components mentioned above. Generally, the propylene resin composition may be produced by blending a wide variety of the components in any desired order, followed by melting and kneading the blended product. In the production of the resin composition, the melting and kneading method is not restricted. For example, using a single axis extruder, a double axis extruder or a kneader, it becomes possible to obtain a propylene resin composition containing the components uniformly dispersed therein. Note that as described hereinabove, the kneaded propylene resin composition has preferably a melt flow rate (MFR) of 0.01 to 1.00 g/10 min., more preferably of 0.01 to 0.80 g/10 min. Further, since the good moldability can be stably obtained, it is especially preferred that the melt flow rate is not more than 0.80 g/10 min.

The propylene resin composition, especially suitable for the production of the piping members, produced as mentioned above may be defined with regard to its creeping characteristic (creep resistance). It is desired that when the creep resistance is determined with a tensile load of 3.5 MPa under the atmosphere of 95° C., the time required to cause a breakage of the propylene resin composition of the present invention is not less than 1,000 hours. Such a creep resistance of not less than 1,000 hours is suitable, since the propylene resin-made piping members such as valves and pipes produced using the propylene resin composition of the present invention can be used for a long time period, while guiding a fluid at a high temperature through the piping members with application of an inner pressure thereto. Note that the phrase "with a tensile load of 3.5 MPa under the atmosphere of 95° C., the time required to cause a breakage of the propylene resin composition of the present invention is not less than 1,000 hours" represents the test conditions applied to the test pieces. When the test is carried out using the piping member, especially pipes, as the test piece, the test can be accomplished by applying an inner pressure equivalent to the tensile load of 3.5 MPa to an inner portion of the pipe. The inner pressure of the pipe can be calculated from the inner diameter and thickness of the pipe and the tensile load of 3.5 MPa according to the following Naday equation (1):

$$\text{inner pressure of pipe} = \frac{2 \times (\text{thickness of pipe}) \times (\text{test stress applied}^*)}{(\text{outer diameter of pipe}) - (\text{thickness of pipe})} \quad (1)$$

test stress applied* is the tensile strength applied in the test.

For example, when a thickness of the pipe is 3.0 mm and an outer diameter of the pipe is 32 mm, an inner pressure of the pipe is calculated using the above equation (1) to be 0.7 MPa.

The propylene resin composition according to the present invention can be advantageously used in the production of a wide variety of molded bodies, i.e., molded articles. Especially, since it has excellent properties such as transparency, thermal resistance and creep resistance at a high temperature as described above, the resin composition can be advantageously used in the production of piping members. Although they are not restricted to the followings, typical examples of suitable piping members include pipes having a single layer structure or a multilayer structure produced in accordance with an extrusion molding method, and joints, flanges, valves and casings for an actuator produced in accordance with an injection molding method.

The molded articles can be produced from the propylene resin composition of the present invention using any well-known molding method such as extrusion molding and injection molding, and any well-known molding apparatuses. For example, when the pipe is produced using an extrusion molding method, the propylene resin composition is pelletized, and the resulting pellets are filled in an single axis extruder, followed by extrusion molding in a metal mold at a high cylinder temperature. The pipes having a predetermined configuration and size can be produced, accordingly.

EXAMPLES

The present invention will be further described with reference to the examples thereof. It should be noted, however, that the present invention is not restricted to only the following examples.

[Test Methods]

The properties of the propylene resin composition according to the present invention and the properties of the propylene resin-made piping member (pipe) molded using the above resin composition were evaluated according to the following test methods.

(1) test for determining melt flow rate (MFR, Unit: g/10 min)

After kneading, the MFR of the kneaded propylene resin composition is determined at the test temperature of 230° C. and under the application of the test load of 2.16 kg on the basis of the JIS standard: JIS K7210.

(2) tensile test (unit: MPa)

After separation of specimens for the tensile test from the propylene resin-made pipe, the specimens are subjected to the tensile test at the atmosphere of 23+/−1° C. on the basis of the JIS standard: JIS K7113 to determine a tensile strength and tensile elasticity of the specimens.

(3) test for determining izod impact strength on notched Specimens (unit: $kJ/m^2$)

After separation of notched specimens for the Izod impact test from the propylene resin-made pipe, the specimens are subjected to the Izod impact test at the atmospheres of 23+/−1° C. and 0+/−1° C. on the basis of the JIS standard: JIS K7110 to determine a Izod impact strength of each of the specimens.

(4) test for determining transparency (haze, unit: %)

Using the haze meter, the haze of the specimens are determined on the basis of the JIS standard: JIS K7361. The haze is a criteria for the transparency. When the haze is a small value, it means that, when visually inspected, a clearness of the specimen is good, that is, the specimen exhibits a high transparency.

(5) test for differential scanning calorimetry analysis

Using the differential scanning calorimeter (Thermo plus DSC 8230, commercially available from Rigaku Co.), 5 mg of the sheet-shaped sample piece is filled in the aluminum pan. The sample piece is heated at a heating rate of 10° C./min from the room temperature to 230° C. which is then maintained for 10 minutes. After maintenance of 10 minutes, the sample piece is cooled at a cooling rate of 5° C./rain to detect thermal peaks during cooling. A crystallization energy (ΔH) and crystallization degree (unit: %) of the sample piece are determined from the resulting peaks. Further, the resulting maximum peak temperature at the crystallization is labeled as the crystallization temperature (unit: ° C.).

(6) test for determining creep resistance at high Temperature

The creep test is carried out on the basis of the DIN standard: DIN8078. Under the atmosphere of 95+/−1° C., an inner pressure of 0.7 MPa is applied to the propylene resin-made pipe having a length of 1,000 mm to determine the time required to cause a breakage of the pipe. The inner pressure of the pipe corresponds to that determined at the thickness of 3.0 mm and outer diameter of 32 mm of the pipe and the test stress applied of 3.5 MPa, and is calculated according to the following Naday equation (1):

$$\text{inner pressure of pipe} = \frac{2 \times (\text{thickness of pipe}) \times (\text{test stress applied})}{(\text{outer diameter of pipe}) - (\text{thickness of pipe})} \quad (1)$$

[Test Procedure and Evaluation Criteria]

After a wide variety of the propylene resin compositions having different constitutions of the components were prepared, the MFR of the resin compositions is determined. Then, the pipes are produced from the resin compositions with an extrusion molding method. Using the pipes, the physical properties of the pipes are evaluated. During evaluation of the physical properties, the criteria of the evaluation "passed (acceptance)" is as follows.

For the purpose of suitably using the pipe as the piping member, especially for obtaining a good sealing property when the valve is used under the high temperature condition, the piping member should have a tensile elasticity of not less than 1,100 MPa. Further, for obtaining a good impact resistance suitable as the piping member, the piping member should have an Izod impact strength of not less than 16 kJ/m$^2$, more desirably not less than 20 kJ/m$^2$ for use in a long time period. Furthermore, for the application of fluids at a high temperature for a long time period, the piping member should exhibit the time of not less than 1,000 hours required to cause a breakage of the piping member under the inner pressure-applied hot creep test. Moreover, for enabling to visually inspect a state of the fluid flowing through the piping member, the piping member should have a haze, showing the transparency, of not more than 70%.

Example 1

30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended. The resulting blend was kneaded and pelletized in a double axis extruder to produce a propylene resin composition having a melt flow rate (MFR), determined for the kneaded resin composition, of 0.56 g/10 min. Then, the resulting resin composition was molded in a single axis extruder at a cylinder temperature of 210° C. to obtain a propylene resin-made pipe having a thickness of 3.0 mm and an outer diameter of 32 mm. The propylene-resin made pipe was then fabricated to obtain specimens for use in different evaluation tests. The specimens were tested for the tensile, notched Izod impact, transparency, differential scanning calorimetry and high temperature creep tests described above. The evaluation results are summarized in the following Table 1.

Example 2

The procedure of Example 1 was repeated except that, in this example, 30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 2.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.54 g/10 min. Then, the resin composition was molded to obtain a propylene resin-made pipe which was then subjected to different evaluation tests. The results are summarized in the following Table 1.

Example 3

The procedure of Example 1 was repeated except that, in this example, 30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 8.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.59 g/10 min. Then, the resin composition was molded to obtain a propylene resin-made pipe which was then subjected to different evaluation tests. The results are summarized in the following Table 1.

Example 4

The procedure of Example 1 was repeated except that, in this example, 30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a crystalline nucleating agent based on a metal salt of phosphate ester (PPM ST-0451, commercially available from Tokyo Ink Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Example 5

The procedure of Example 1 was repeated except that, in this example, 30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.), 0.2 parts by mass of a crystalline nucleating agent based on a metal salt of phosphate ester (PPM ST-0451, commercially available from Tokyo Ink Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Example 6

The procedure of Example 1 was repeated except that, in this example, 30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a hydrogenated styrene-butadiene elastomer (Toughtec H1062, commercially available from Asahi Kasei Chemicals Co.; average particle diameter of 100 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Example 7

The procedure of Example 1 was repeated except that, in this example, 50 parts by mass of an ethylene-propylene random copolymer (ethylene content of 3.2%, MFR of 0.5 g/10 min), 50 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Example 8

The procedure of Example 1 was repeated except that, in this example, 70 parts by mass of an ethylene-propylene random copolymer (ethylene content of 3.2%, MFR of 0.5 g/10 min), 30 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Example 9

The procedure of Example 1 was repeated except that, in this example, 90 parts by mass of an ethylene-propylene random copolymer (ethylene content of 3.2%, MFR of 0.5 g/10 min), 10 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.57 g/10 min. Then, the resin composition was molded to obtain a propylene resin-made pipe which was then subjected to different evaluation tests. The results are summarized in the following Table 1.

Example 10

The procedure of Example 1 was repeated except that, in this example, 100 parts by mass of an ethylene-propylene random copolymer (ethylene content of 3.2%, MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Example 11

The procedure of Example 1 was repeated except that, in this example, 30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a hydrogenated styrene-butadiene elastomer (average particle diameter of 600 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 1.

Comparative Example 1

30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 15.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.76 g/10 min. Then, the resin composition was molded to obtain a propylene resin-made pipe which was then subjected to different evaluation tests. The results are summarized in the following Table 2.

Comparative Example 2

30 parts by mass of an ethylene-propylene random copolymer (ethylene content of 3.2%, MFR of 0.5 g/10 min), 70 parts by mass of a propylene homopolymer (MFR of 0.5 g/10 min), and 0.2 parts by mass of a nonitol-based crystalline nucleating agent (Millad NX8000, commercially available from MILLIKEN Co.) were blended, and then kneaded and pelletized in a double axis extruder to produce a kneaded propylene resin composition having a melt flow rate of 0.52 g/10 min. Then, the resin composition was molded to obtain a propylene resin-made pipe which was then subjected to different evaluation tests. The results are summarized in the following Table 2.

Comparative Example 3

30 parts by mass of an ethylene-propylene random copolymer (ethylene content of 3.2%, MFR of 0.5 g/10 min), 70 parts by mass of a propylene homopolymer (MFR of 2.0 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 1.68 g/10 min. Then, the resin composition was molded to obtain a propylene resin-made pipe which was then subjected to different evaluation tests. The results are summarized in the following Table 2.

Comparative Example 4

30 parts by mass of an ethylene-propylene random copolymer (ethylene content of 3.2%, MFR of 0.5 g/10 min), 70 parts by mass of a propylene homopolymer (MFR of 0.5 g/10 min), and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 2.

Comparative Example 5

30 parts by mass of an ethylene-propylene random copolymer (ethylene content of 3.2%, MFR of 0.5 g/10 min), 70 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a hydrogenated styrene-butadiene elastomer (Toughtec N504, commercially available from Asahi Kasei Chemicals Co.; average particle diameter of 1 μm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 2.

Comparative Example 6

100 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 2.

Comparative Example 7

100 parts by mass of an ethylene-propylene random copolymer (ethylene content of 3.2%, MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. The results are summarized in the following Table 2.

Comparative Example 8

10 parts by mass of an ethylene-propylene random copolymer (ethylene content of 3.2%, MFR of 0.5 g/10 min), 90 parts by mass of a propylene homopolymer (MFR of 0.5 g/10 min), 0.2 parts by mass of a nonitol-based crystalline nucleating agent (Millad NX8000, commercially available from MILLIKEN Co.) and 5.0 parts by mass of a α-olefine copolymer (NOTIO PN-2060, commercially available from Mitsui Chemical Co.; average particle diameter of 20 nm) were blended, and then kneaded and pelletized in a double axis extruder to produce a kneaded propylene resin composition having a melt flow rate of 0.56 g/10 min. Then, the resin composition was molded to obtain a propylene resin-made pipe which was then subjected to different evaluation tests. Note in this comparative example that an ethylene content of the ethylene-propylene random copolymer is calculated to be less than 0.5 parts by mass. The results are summarized in the following Table 2.

Comparative Example 9

30 parts by mass of an ethylene-propylene random copolymer (ethylene content of 3.2%, MFR of 0.5 g/10 min) and 70 parts by mass of a propylene homopolymer (MFR of 0.5 g/10 min) were blended, and then kneaded and pelletized in a double axis extruder to produce a kneaded propylene resin composition having a melt flow rate of 0.50 g/10 min. Then, the resin composition was molded to obtain a propylene resin-made pipe which was then subjected to different evaluation tests. The results are summarized in the following Table 2.

TABLE 1

|  |  | Ex. 1 | Ex. 2 | Ex. 3 | Ex. 4 | Ex. 5 | Ex. 6 |
|---|---|---|---|---|---|---|---|
| Composition (parts by mass) | ethylene-propylene random copolymer (ethylene3.2%, MFR0.5) | 30 | 30 | 30 | 30 | 30 | 30 |
|  | ethylene-propylene random copolymer (ethylene1.0%, MFR0.5) | — | — | — | — | — | — |
|  | propylene homopolymer (ethylene0%, MFR0.5) | 70 | 70 | 70 | 70 | 70 | 70 |
|  | nonitol-based nucleating agent | 0.2 | 0.2 | 0.2 | — | 0.2 | 0.2 |
|  | phosphate-based nucleating agent | — | — | — | 0.2 | 0.2 | — |
|  | α-olefine copolymer (ave. particle diameter of about 20 nm) | 5 | 2 | 8 | 5 | 5 | — |
|  | hydrogenated SEBS (ave. particle diameter of about 100 nm) | — | — | — | — | — | 5 |
|  | hydrogenated SEBS (ave. particle diameter of about 600 nm) | — | — | — | — | — | — |
| tensile strength | MPa | 39 | 40 | 38 | 38 | 39 | 39 |
| tensile elasticity | MPa | 1427 | 1520 | 1282 | 1297 | 1374 | 1384 |
| Izod impact strength | kJ/m$^2$ | 30 | 23 | 37 | 29 | 35 | 31 |
| haze | % | 59.5 | 59.3 | 60.3 | 66.3 | 59.5 | 59.3 |
| crystallization degree | % | 57 | 57 | 57 | 57 | 57 | 57 |
| crystallization temp. | ° C. | 130 | 130 | 130 | 131 | 130 | 130 |
| MFR of kneaded composition | g/10 min | 0.56 | 0.54 | 0.59 | 0.56 | 0.56 | 0.56 |
| creep resistance test | hr | >1000 | >1000 | >1000 | >1000 | >1000 | >1000 |

|  |  | Ex. 7 | Ex. 8 | Ex. 9 | Ex. 10 | Ex. 11 |
|---|---|---|---|---|---|---|
| Composition (parts by mass) | ethylene-propylene random copolymer (ethylene3.2%, MFR0.5) | 50 | 70 | 90 | — | 30 |
|  | ethylene-propylene random copolymer (ethylene1.0%, MFR0.5) | — | — | — | 100 | — |
|  | propylene homopolymer (ethylene0%, MFR0.5) | 50 | 30 | 10 | — | 70 |
|  | nonitol-based nucleating agent | 0.2 | 0.2 | 0.2 | 0.2 | 0.2 |
|  | phosphate-based nucleating agent | — | — | — | — | — |
|  | α-olefine copolymer (ave. particle diameter of about 20 nm) | 5 | 5 | 5 | 5 | — |
|  | hydrogenated SEBS (ave. particle diameter of about 100 nm) | — | — | — | — | — |
|  | hydrogenated SEBS (ave. particle diameter of about 600 nm) | — | — | — | — | 5 |
| tensile strength | MPa | 38 | 37 | 35 | 39 | 39 |
| tensile elasticity | MPa | 1307 | 1211 | 1120 | 1420 | 1420 |
| Izod impact strength | kJ/m$^2$ | 37 | 41 | 45 | 32 | 29 |
| haze | % | 57.3 | 56.3 | 55.7 | 60.4 | 60.9 |
| crystallization degree | % | 53 | 48 | 42 | 56 | 57 |
| crystallization temp. | ° C. | 130 | 128 | 125 | 131 | 130 |
| MFR of kneaded composition | g/10 min | 0.56 | 0.56 | 0.57 | 0.56 | 0.56 |
| creep resistance test | hr | >1000 | >1000 | >1000 | >1000 | >1000 |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Composition (parts by mass) | ethylene-propylene random copolymer (ethylene3.2%, MFR0.5) | 30 | 30 | 30 | 30 | 30 |
|  | propylene homopolymer (ethylene0%, MFR0.5) | 70 | 70 | — | 70 | 70 |
|  | propylene homopolymer (ethylene0%, MFR2.0) | — | — | 70 | — | — |
|  | nonitol-based nucleating agent | 0.2 | 0.2 | 0.2 | — | 0.2 |
|  | phosphate-based nucleating agent | — | — | — | — | — |
|  | α-olefine copolymer (ave. particle diameter of about 20 nm) | 15 | — | 5 | 5 | — |
|  | hydrogenated SEBS (ave. particle diameter of about 1 μm) | — | — | — | — | 5 |
| tensile strength | MPa | 34 | 39 | 39 | 36 | 38 |
| tensile elasticity | MPa | 990 | 1459 | 1387 | 1176 | 1589 |
| Izod impact strength | kJ/m$^2$ | 60 | 12 | 29 | 16 | 15 |
| haze | % | 60.5 | 56.3 | 57.2 | 75.3 | 71.3 |
| crystallization degree | % | 57 | 58 | 57 | 55 | 57 |
| crystallization temp. | ° C. | 131 | 132 | 131 | 119 | 130 |
| MFR of kneaded composition | g/10 min | 0.76 | 0.52 | 1.68 | 0.56 | 0.56 |
| creep resistance test | hr | 800 | >1000 | 500 | >1000 | >1000 |

TABLE 2-continued

| | | Comp. Ex. 6 | Comp. Ex. 7 | Comp. Ex. 8 | Comp. Ex. 9 |
|---|---|---|---|---|---|
| Composition (parts by mass) | ethylene-propylene random copolymer (ethylene3.2%, MFR0.5) | — | 100 | 10 | 30 |
| | propylene homopolymer (ethylene0%, MFR0.5) | 100 | — | 90 | 70 |
| | propylene homopolymer (ethylene0%, MFR2.0) | — | — | — | — |
| | nonitol-based nucleating agent | 0.2 | 0.2 | 0.2 | — |
| | phosphate-based nucleating agent | — | — | — | — |
| | α-olefine copolymer (ave. particle diameter of about 20 nm) | 5 | 5 | 5 | — |
| | hydrogenated SEBS (ave. particle diameter of about 1 μm) | — | — | — | — |
| tensile strength | MPa | 41 | 34 | 40 | 38 |
| tensile elasticity | MPa | 1727 | 997 | 1702 | 1395 |
| Izod impact strength | kJ/m$^2$ | 12 | 47 | 15 | 15 |
| haze | % | 60.3 | 56.3 | 59.5 | 76.7 |
| crystallization degree | % | 57 | 40 | 58 | 55 |
| crystallization temp. | °C. | 130 | 123 | 131 | 118 |
| MFR of kneaded composition | g/10 min | 0.56 | 0.56 | 0.56 | 0.50 |
| creep resistance test | hr | >1000 | >1000 | >1000 | >1000 |

Referring to Tables 1 and 2 described above, Examples 1, 7, 8 and 9 and Comparative Examples 6, 7 and 8 indicate that an ethylene content of the ethylene-propylene random copolymer was varied by modifying a blending ratio of the ethylene-propylene random copolymer having an ethylene content of 3.2% and the propylene homopolymer. In each of these examples, a blending ratio of ethylene-propylene random copolymer (ethylene content of 3.2%): propylene homopolymer, and an ethylene content per 100 parts by mass of the ethylene-propylene random copolymer are as follows:

Comp. Example 7: 100:0 (ethylene content of about 3.3 parts by mass);

Example 9: 90:10 (ethylene content of about 3.0 parts by mass);

Example 8: 70:30 (ethylene content of about 2.3 parts by mass);

Example 7: 50:50 (ethylene content of about 1.6 parts by mass);

Example 1: 30:70 (ethylene content of about 1.0 parts by mass);

Comp. Example 8: 10:90 (ethylene content of about 0.3 parts by mass); and

Comp. Example 6: 0:100 (ethylene content of 0 parts by mass).

In these examples, when the ethylene-propylene random copolymer having an ethylene content of 3.2% is used in a higher amount in comparison with the propylene homopolymer, i.e., an ethylene content of the ethylene-propylene random copolymer is increased, the Izod impact strength can be improved in the pipes, while lowering the tensile strength and the tensile elasticity. On the other hand, when the propylene homopolymer is used in a higher amount in comparison with the ethylene-propylene random copolymer having an ethylene content of 3.2%, i.e., an ethylene content of the ethylene-propylene random copolymer is lowered, the tensile strength and the tensile elasticity can be improved in the pipes, but the Izod impact strength is lowered due to excessive increase of the tensile elasticity.

Comparative Example 7 shows that the Izod impact strength was increased, but the tensile strength and the tensile elasticity were reduced, and that the tensile elasticity was lower than 1,100 MPa which is desired for the piping members. Further, Comparative Examples 6 and 8 show that the tensile strength and the tensile elasticity were increased, but the Izod impact strength was reduced, and that the Izod impact strength was lower than 16 kj/m$^2$ desired for the piping members. Contrary to these results, the results obtained in Examples 1, 7, 8 and 9 are included within the range of the numerals which are desired for the piping members. Further, Examples 1 and 10 show that the ethylene-propylene copolymer had a comparable ethylene content of about 1.0 parts by mass, and also comparable physical properties could be obtained.

From the above results, it is understood that good tensile strength and tensile elasticity as well as good Izod impact strength could be obtained, since the ethylene-propylene random copolymer used had an ethylene content of 0.5 to 3.5 parts by mass. Therefore, it is desired that the ethylene-propylene random copolymer is prepared by blending a propylene homopolymer with an ethylene-propylene random copolymer, and also a blending ratio of the homopolymer and the random copolymer is controlled depending upon the molding methods used, for example, extrusion molding and injection molding. When it is prepared as described above, the ethylene-propylene random copolymer can be prepared from the resin composition suitable for the molding method used. When blending the propylene homopolymer with the ethylene-propylene random copolymer, it is desired that the blending ratio is controlled such that when the ethylene-propylene random copolymer has an ethylene content of 2.5 to 40%, 75 to 25 parts by mass of the ethylene-propylene random copolymer is blended per 25 to 75 parts by mass of the propylene homopolymer.

Further, the following is appreciated based on the results of Example 1 and Comparative Examples 2, 4 and 9 described in Tables 1 and 2. Comparative Example 4 shows that it is identical with Comparative Example 9, except for inclusion of an elastomer further added, and in Comparative Example 4, the tensile strength and the tensile elasticity were reduced, while slightly increasing the Izod impact strength. Thus, it is appreciated that the physical properties of the resin composition cannot be improved even if the elastomer is added to the resin composition.

Comparative Example 2 shows that it is identical with Comparative Example 9 except for inclusion of a crystalline nucleating agent further added, and in Comparative Example 2, the tensile strength and the tensile elasticity were improved along with reduction of the haze value. Due to reduction of the haze value, a transparency of the pipe could be improved in Comparative Example 2, but due to reduction of the Izod impact strength, the impact strength was insufficient to use the pipe as the piping member.

Contrary to these comparative examples, Example 1 in which both the elastomer and the nucleating agent were added to the resin composition shows that the tensile strength, the tensile elasticity and the transparency were not deteriorated, and also the Izod impact strength could be improved, while the Izod impact strength could not be improved when the elastomer and the nucleating agent were added alone. Thus, it is appreciated that when the elastomer having an average particle diameter of 10 to 800 nm is added in combination with the crystalline nucleating agent, the Izod impact strength can be improved because of the synergistic effects originated from the addition of both the elastomer and the nucleating agent, while maintaining a high tensile strength and tensile elasticity and a transparency. Note that the crystalline nucleating agent is preferably added in a minor amount to the ethylene-propylene random copolymer, since no effect of addition is improved even if excessive addition of the nucleating agent. It is therefore preferred that the nucleating agent is added in an amount of 0.005 to 0.5 parts by mass per 100 parts by mass of the ethylene-propylene random copolymer.

Further, it is appreciated from the results of Examples 1, 6 and 11 and Comparative Example 5 that when different average particle diameters of 20 nm, 100 nm, 600 nm and 1 μm (1,000 nm) were applied as the average particle diameter of the elastomer as described in these examples, good tensile strength, tensile elasticity and Izod impact strength could be simultaneously obtained in Examples 1, 6 and 11, whereas the Izod impact strength was reduced to less than 0.5 of that of the examples when an average particle diameter of the elastomer was increased as in Comparative Example 5.

As the elastomer, Example 1 uses a α-olefine copolymer having an average particle diameter of 20 nm, Example 6 uses a hydrogenated styrene-butadiene elastomer having an average particle diameter of 100 nm, and Example 11 uses a hydrogenated styrene-butadiene elastomer having an average particle diameter of 600 nm. Although different elastomers are used in these examples, the resulting effects are similar in these examples, since the synergistic effect of the elastomer with the nucleating agent is affected depending on the average particle diameter of the elastomer.

Note that other physical properties than the synergistic effect described above will be varied depending on the properties of the elastomer added. For example, for obtaining a good productivity, it is desired that the elastomer has a small average particle diameter of not less than 10 nm. Further, for obtaining a good impact resistance while maintaining a good transparency, it is necessary that the elastomer has an average particle diameter of 10 to 800 nm. Among the elastomers described above, the α-olefine copolymer is suitable, since it can easily form an elastomer having a small average particle diameter.

Furthermore, it is appreciated from the results of Examples 1, 2 and 3 and Comparative Example 1 that when a content of the elastomer added was varied, for example, when the content of the elastomer was increased, the Izod impact strength was improved, while the tensile strength and the tensile elasticity were reduced, and that when the content of the elastomer added was reduced, the tensile strength and the tensile elasticity were improved, while the Izod impact strength was reduced.

Referring to Comparative Example 1, it is noted that although a high Izod impact strength could be obtained, the tensile strength and the tensile elasticity were a low level, and the tensile elasticity was lower than 1,100 MPa which is desired for the piping members, and that the strength determined with the creep resistance test is insufficient due to improvement of the MFR because of the increased content of the elastomer. Further, referring to Comparative Example 2 containing no elastomer, it is noted that although a high tensile strength and tensile elasticity could be obtained, the Izod impact strength was a low level, and the Izod impact strength was lower than 16 kj/m$^2$ which is desired for the piping members.

Contrary to these comparative examples, the results described in Examples 1, 2 and 3 show that they are included within the acceptable range of numerals suitable for the piping members. Accordingly, the elastomer is required to be incorporated in an amount of 1 to 10 parts by mass per 100 parts by mass of the ethylene-propylene random copolymer. Note in Comparative Example 2 having no elastomer incorporated that no improvement in the tensile strength and the tensile elasticity caused by the synergistic effect of the combined use of the elastomer could be obtained, and also the Izod impact strength was a low level.

In addition, comparing Example 1 with Example 4, the tensile elasticity and the transparency were slightly lowered in Example 4 in comparison with those of Example 1, since a metal salt of phosphoric acid ester was used as the crystalline nucleating agent in Example 4, while a nonitol-based crystalline nucleating agent was used in Example 1. However, since the tensile elasticity and the transparency obtained in both of these examples are included within an acceptable range suitable for use as the piping members, it is appreciated that any types of the organic crystalline nucleating agents may be used as the crystalline nucleating agent in the practice of the present invention. Note that among the organic nucleating agents, sugars and phosphoric acids are preferably used as the nucleating agent, and that among the sugars as the nucleating agent, a nonitol-based nucleating agent is preferably used since it can improve a transparency and an impact strength.

Further, referring to Example 5, two types of the crystalline nucleating agents, i.e., a nonitol-based crystalline nucleating agent and a crystalline nucleating agent based on a metal salt of phosphoric acid ester, are used in combination. Since the results obtained in this example are comparable to those obtained in Example 1, it is understood that the crystalline nucleating agents may be used in combination, if desired. Use of two or more crystalline nucleating agents in combination is suitable for the purpose of further improving other physical properties, while maintaining a good tensile strength, tensile elasticity and Izod impact strength. Further, since it is desired that the sugar-based nucleating agents and the organic phosphoric acid-based nucleating agents are used to obtain a good transparency and a good impact resistance originated from the synergistic effect with the elastomer, these nucleating agents may be used in combination.

Referring to Example 1 in Table 1 and Comparative Example 3 in Table 2, since the MFR of the kneaded resin composition is 1.68 g/10 min in Comparative Example 3, the result of the creep resistance test in the same example is 500 hr which is less than 0.5 of the result described in Example 1. Further, for the purpose of obtaining a good creep resistance at a high temperature and a good extrusion moldability, it is necessary that the kneaded resin composition has a MFR value of 0.01 to 1.00 g/10 min, since when the MFR value of the kneaded resin composition is increased above 1.00 g/10 min, a draw down of the resin capable of causing a difficulty of molding may be generated during extrusion molding of the pipes.

As is appreciated from the above descriptions, since the propylene resin-made piping members according to the present invention which contain as the essential components thereof an ethylene-propylene random copolymer and an elastomer having the an average particle diameter of 10 to 800 nm are excellent in the mechanical properties such as tensile strength, tensile elasticity and Izod impact strength, and in the creep resistance at a higher temperature, the piping members can be stably used when a fluid at a temperature of 95° C. is passed through the same piping members for a long period of time. Further, since a transparency of the piping members can be remarkably improved, thereby enabling to visually inspect the incorporation of foreign substances in the fluid guided through the piping members, because of blending a crystalline nucleating agent to the propylene resin composition, the piping members can be suitably used in a wide variety of piping lines or systems used in food industries, medical industries and semiconductor industries from which the incorporation of foreign substances should be excluded.

In the working examples described above, the present invention was described with regard to use of the propylene resin-made pipes produced through the extrusion molding, similar results can be obtained in other piping members such as multilayered pipes produced with an extrusion molding method, and joints, flanges, valves and casings for an actuator produced with an injection molding method.

Industrial Applicability

The propylene resin composition according to the present invention can be advantageously used in the production of a wide variety of molded articles. The molded articles may be entirely or partially formed from the propylene resin composition of the present invention. The production of the resin composition may be advantageously carried out using any molding methods such as extrusion molding and injection molding in the conventional molding apparatuses. If desired, other molding methods may be used. Examples of suitable molded articles include single layered or multilayered pipes produced with an extrusion molding method, and joints, flanges, valves and casings for an actuator produced with an injection molding method. Other examples include plates, tanks and ducts. In addition, more specifically, the propylene resin composition of the present invention can be advantageously used in the production of piping members such as single layered or multilayered pipes, joints, flanges, valves and casings for an actuator.

The invention claimed is:

1. A propylene resin composition which contains as essential components thereof (A) an ethylene-propylene random copolymer having an ethylene content of 0.5 to 3.0 parts by mass; (B) an elastomer having an average particle diameter of 10 to 800 nm in an amount of 1 to 10 parts by mass based on 100 parts by mass of the ethylene-propylene random copolymer; and (C) an organic crystalline nucleating agent in an amount of 0.005 to 0.5 parts by mass based on 100 parts by mass of the ethylene-propylene random copolymer, and in which after kneading thereof, the kneaded propylene resin composition exhibit a melt flow rate (MFR) of 0.01 to 1.00 g/10 min, and the ethylene-propylene random copolymer (A) is a blend of 25 to 75 parts by mass of propylene homopolymer and 75 to 25 parts by mass of ethylene-propylene random copolymer.

2. The propylene resin composition according to claim 1, in which the crystalline nucleating agent (C) is a nucleating agent based on sugars and/or a nucleating agent based on organic phosphoric acids.

3. The propylene resin composition according to claim 1, in which when the creep resistance is determined with a tensile load of 3.5 MPa in an atmosphere of 95° C., the time required to cause a breakage of the composition is not less than 1,000 hours.

4. The propylene resin composition according to claim 1, which is used as a molding material for piping members.

5. A molded article which is a molded product produced from the propylene resin composition according to claim 1.

6. The molded article according to claim 5 in which the molded article is a pipe, a multilayered pipe, a plate, a tank, a duct, a joint, a flange, a valve or a casing of an actuator.

7. A piping member at least a part of which is a molded product produced from the propylene resin composition according to claim 1.

* * * * *